Inventor
ERNEST A. KELLER 3,422,396
TARGET INFORMATION DETERMINING SYSTEM
Ernest A. Keller, Wilmette, Ill., assignor to Motorola, Inc., Franklin Park, Ill., a corporation of Illinois
Filed June 26, 1967, Ser. No. 648,657
U.S. Cl. 340—3     13 Claims
Int. Cl. G01s 9/66

ABSTRACT OF THE DISCLOSURE

Echo signals are processed to determine the direction from which the echo signal is received. The time between transmission of a signal and return of the echo is measured to determine the range to a target. Doppler frequency shifts are measured to determine the component of the relative motion of the target along a line between a reference position and the target. A plan position indicator displays shows the relative location of the target by displaying the range and bearing of the target from the center of the indicator. A radial streak, originating at the target, indicates the direction of Doppler shift and the magnitude of the shift. The brightness of the target indicates the relative confidence in the indicated position of the target.

Summary

It is an object of this invention to provide a target information system having an improved target display system.

Another object of this invention is to provide a target information system having a display system showing the relative position and relative motion of the target together with an indication of the confidence of the target's position.

Another object of this invention is to provide a target information system for determining the movement of the target relative to a reference position.

In practicing this invention a transmitter is provided which periodically transmits wave pulses. The wave pulses are reflected from a target and the returning echos are picked up by a plurality of receiving transducers. Signal processing means develop bearing signals, designated as X and Y, in response to the waves received by the transducers. The bearing signals are squared and added to form a merit signal, $Z^2 = X^2 + Y^2$. A threshold signal $L_{TH}$, having a selected magnitude, is generated and compared with the received merit signal. If the merit signal is greater than the threshold signal it represents a target and the position of the target is displayed on a cathode ray tube. The range is determined by timing the interval between the transmission of the pulses and the receipt of the echo. A plurality of signal processing means may be provided, each having filters responsive to different frequency bands, to determine the amount and direction of Doppler frequency shift, to thereby determine the component of motion of the target relative to a reference position. The magnitude and direction of the relative motion is displayed by means of a radial line originating at the target. The radial line points in the direction of the relative motion of the target and the length of the radial line shows the magnitude of the relative motion. The brightness of the target displayed indicates the confidence in the position shown on the display.

Figure 1:
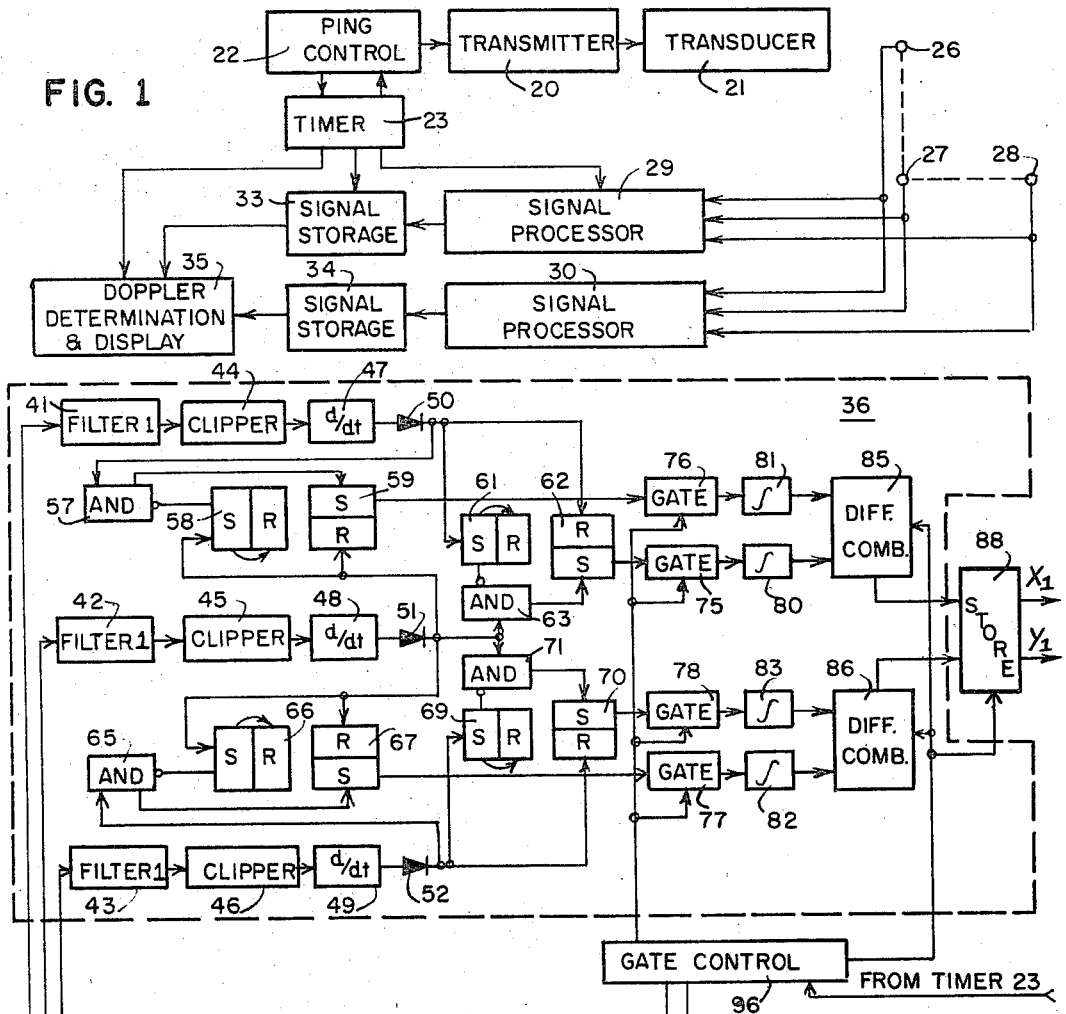
Figure 2:
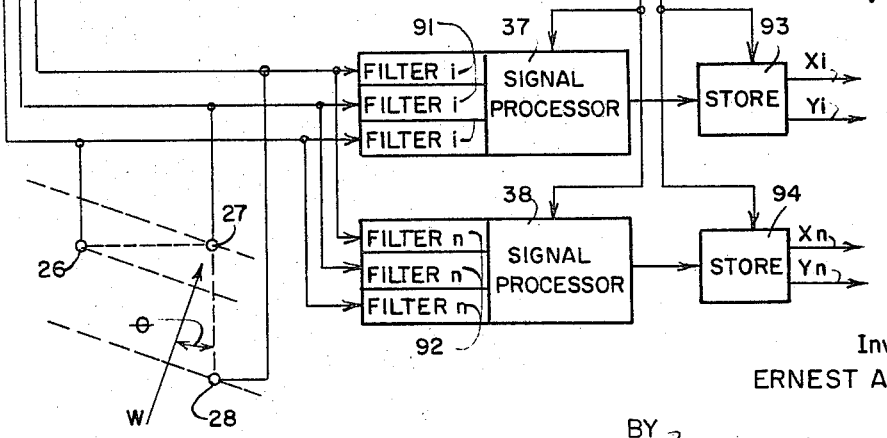
Figure 3:
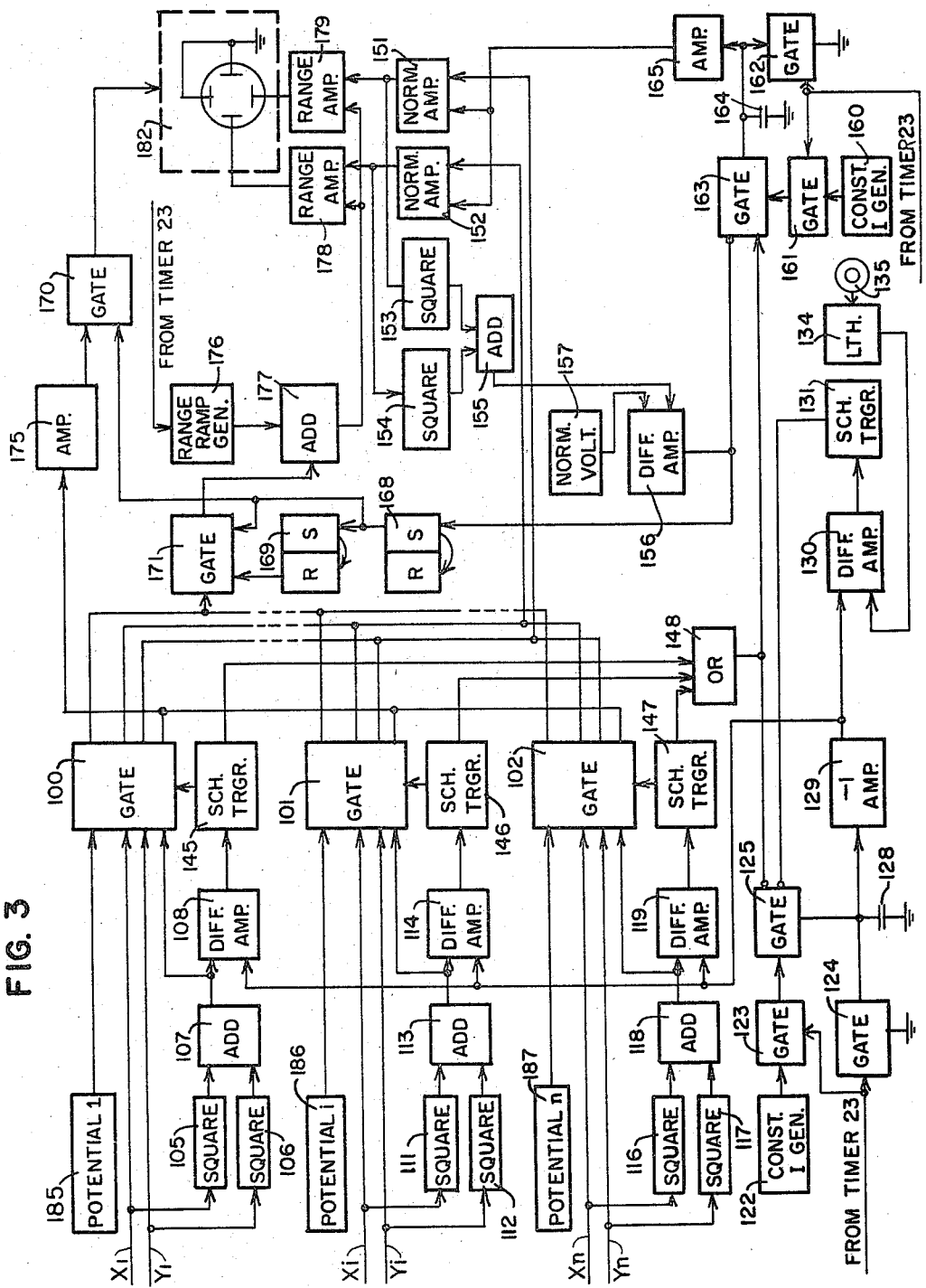
Figure 4:
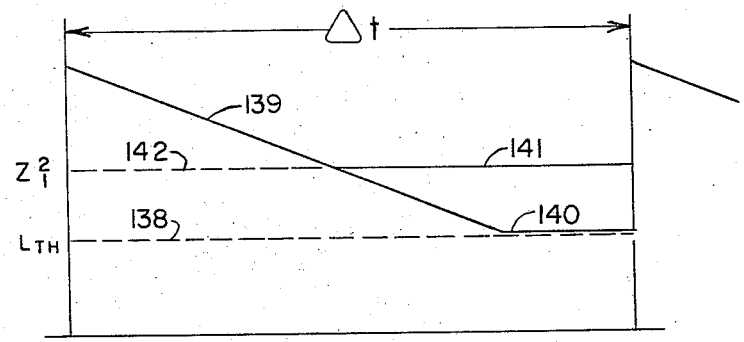
Figure 5:
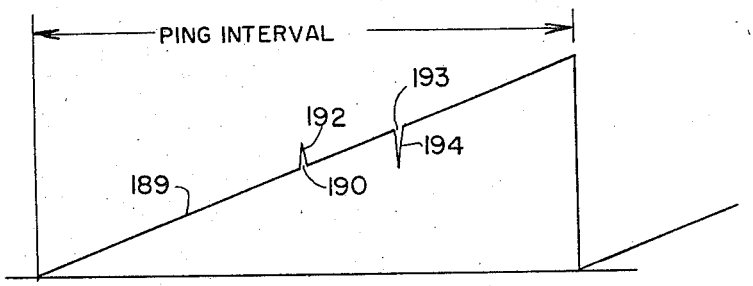
Figure 6:
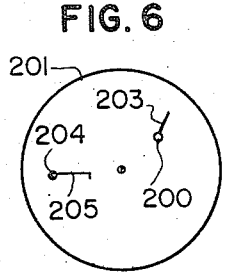
Figure 7:
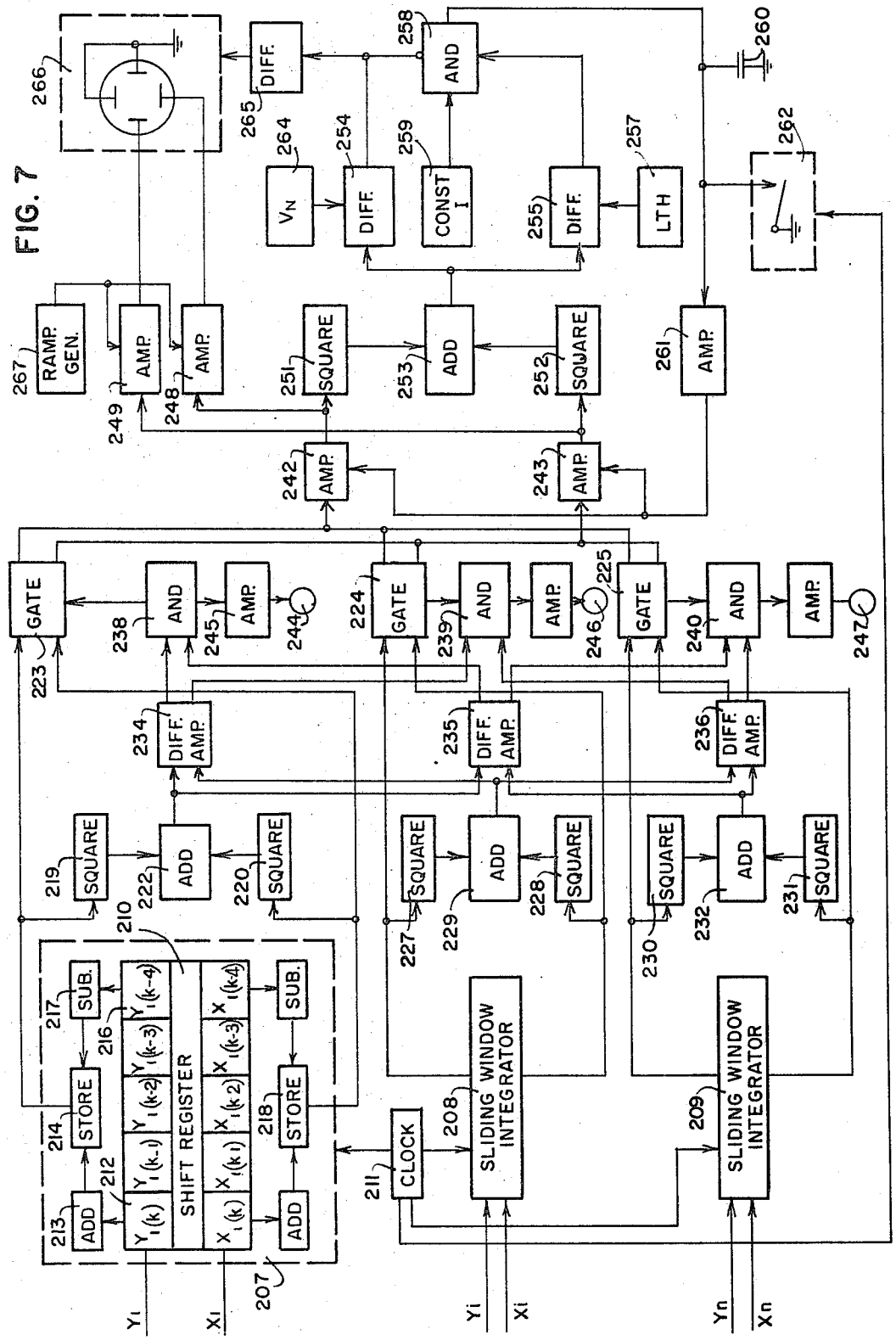

The invention is illustrated in the drawings of which:
FIG. 1 is a simplified block diagram of the system;
FIG. 2 is a block diagram of the signal processing portion of the system;
FIG. 3 is a block diagram of the relative motion processing and display portion of the system;
FIGS. 4 and 5 are sets of curves illustrating the operation of the range processing and display portion of the system shown in FIG. 3;
FIG. 6 is a drawing of the cathode ray tube target display; and
FIG. 7 is a drawing of another embodiment of the range processing and display portion of the system.

Description

Referring to the drawings, in FIG. 1 there is shown a range bearing and Doppler determination and display system. Ping control unit 22 actuates transmitter 20 to develop a transmitted wave pulse which is coupled to the propagation medium by transducer 21. Ping control 22 also actuates timer 23 which provides control signals for the processing units of the system. At the end of a time period, determined by time 23, ping control 22 is again actuated to transmit another wave pulse.

Echo pulses from targets are received by transducers 26, 27 and 28 which are arranged in an array whereby the line connecting transducers 26 and 27 is at right angles to the line connecting transducers 27 and 28. The returning echoes are coupled to a plurality of signal processors, represented by signal processors 29 and 30, to develop a plurality of bearing signals. The bearing signals are stored in signal storage units 33 and 34 respectively. The signals stored in storage units 33 and 34 are processed by the Doppler determination and display system 35 which signal processors 29 and 30 are processing subsequent echo signals. While only two signal processors 29 and 30 are shown, the system may use one or any number of signal processors depending upon the degree to which the Doppler frequency shift is to be measured.

Referring to FIG. 2, there is shown a block diagram of the signal processing units used in the system. Signals received by transducers 26, 27 and 28 are coupled to filters 41, 42 and 43 of signal processor 36, filters 91 of signal processor 37 and filters 92 of signal processor 38. The filters are used to determine the degree of Doppler shift which is caused by the relative motion of the target. If the target is stationary the frequency of the returning signal will be the same as the frequency of the transmitted signal and, for example, received signals would be passed by filters 41, 42 and 43 while filters 91 and 92 would attenuate the signals. If the relative motion of the target was toward the signal processing unit, the frequency of the returning signal would be increased. The passband of filters 91 could be set to pass the increased frequency signals while filters 41, 42 and 43 and 92 attenuate the signal. If the relative movement of the target is away from the receiving transducers, the frequency of the returning signal will be lower than that of the transmitted signal. The passband of filters 92 could be set to pass the lower frequency signal while filters 41, 42, 43 and 91 attenuate the returning signal. Thus, the filters of signal processors 36, 37 and 38 determine which of the signal processors receives the echo signal and thus the amount of Doppler shift of the echo signal. While three signal processors are used, any number can be used in the system depending upon the degree to which the Doppler shift is to be determined. If it is not desired to determine the Doppler shift only one signal processing unit is required and the display system will display the target without showing the Doppler shift.

Referring to signal processor 36 of FIG. 2, the signal waves received by filters 41, 42, 43 and clipped in clippers 44, 45 and 46 respectively. The resulting square waves are differentiated in differentiators 47, 48 and 49 and further clipped by diodes 50, 51 and 52 to develop sharp pulses corresponding to the leading or trailing edges, as desired, of the received signals. These pulses are used to time the receipt of the waves by transducers 26, 27 and 28.

Assume that a wave W approaches transducers 26 and 27 and 28 as shown in FIG. 2. It can be seen that the wave will be received by transducer 28 first, transducer 26 second and transducer 27 third. By timing the interval between the receipt of the waves by transducers 26 and 27 and transducers 28 and 27, the angle $\theta$, representing the relative bearing of the wave W, can be determined.

Wave W, upon reaching transducer 28, develops a signal pulse at the output of diode 52 which is coupled to AND gate 65. The output of AND gate 65 shifts bistable multivibrator 67 to its set state. With bistable multivibrator 67 in its set state an output signal is applied through gate 77 to integrator 82. The output of diode 52 also acts to shift monostable multivibrator 69 to its set state and bistable multivibrator 70 to its reset state. With bistable multivibrator 70 in its reset state, no output is applied from multivibrator 70 to gate 78. The output from monostable multivibrator 69 in its set state is applied to AND gate 71 inhibiting AND gate 71.

With the receipt of the wave W by transducer 26 the same action takes place in AND gate 57, monostable multivibrator 58, bistable multivibrator 59, monostable multivibrator 61, and bistable multivibrator 62. Thus at the time the signal wave reaches transducer 26 an output signal from bistable multivibrator 59 is applied through gate 76 to integrator 81. At the same time, with bistable multivibrator 62 shifted to its reset state there is no signal applied to integrator 80. When signal wave W reaches transducer 27 the output signal from diode 51 is applied to AND gates 63 and 71. However, these AND gates are inhibited by the signals from the set stages of monostable multivibrators 61 and 69 and therefore bistable multivibrators 62 and 70 remain in the reset state and there are no signals applied to integrators 80 and 83. The signals from diode 51 are also applied to monostable multivibrators 58 and 66 returning them to their set states, and the bistable multivibrators 59 and 67 returning them to their reset states. When monostable multivibrators 59 and 67 return to their reset states the signal applied to integrators 81 and 82 stop.

Integrators 81 and 82 act to sum up the signals applied thereto during a predetermined time interval designated as $\Delta t$. $\Delta t$ is determined by gate control 96 which is actuated by timer 23 shown in FIG. 1. During a ping interval, that is the time between transmission of wave pulses from the transmitter, a plurality of $\Delta t$ periods are measured. Prior to the start of each $\Delta t$ period, gate control 96 acts to empty integrators 80, 81, 82 and 83. At the start of the integrating period, gate control 96 acts to open gates 75, 76, 77 and 78 to permit the transfer of any signals which are received to the respective integrators. The duration of the signal which is received by each integrator depends upon the time interval between the receipt of the returning echo by transducers 26, 27 and 28. When many signal waves are received over a time period $\Delta t$, each wave is added to the sum stored in the integrators. Since the echo signal will always come from the same source while random noise signals come from random directions, the received echo signals will add while the noise signals will cancel so that the bearing signal can be determined even when the echo signal is below the ambient noise.

The output signals from the integrators are combined in differential combiners 85 and 86 to provide bearing signals designated as $X_1$ and $Y_1$. Gate control 96 acts to transfer the $X_1$ and $Y_1$ bearing signals from combiners 85 and 86 to a storage unit 88 where they are stored during the subsequent $\Delta t$ period.

Each of the other signal processors 37 and 38 produce X and Y signals which are also stored in their respective storing units 93 and 94. In this example it is assumed that there are $n$ signal processors numbered from 1 to $n$. In FIG. 2 the signal processors producing signals $X_1$, $Y_1$; $X_i$, $Y_i$ and $X_n$, $Y_n$ are shown.

In FIG. 3 there is shown a block diagram of the relative motion processing and display portion of the system. The bearing signals $X_1$, $Y_1$ through $X_n$, $Y_n$ are coupled to this unit. In FIG. 3 three such inputs are represented. $X_1$, $Y_1$ represents the frequency of the transmitted wave. The filters receiving the signals from which bearing signals $X_i$, $Y_i$ are developed are designed to respond to an up Doppler shift while the filters receiving the signals from which bearing signals $X_n$, $Y_n$ are developed are designed to respond to a down Doppler shift. While only two Doppler shift frequencies are shown in FIG. 3, any number of frequencies desired can be used.

The $X_1$ and $Y_1$ signals are applied to gate 100. These signals are also coupled to squaring units 105 and 106 to form $X_1^2$, $Y_1^2$. The squared signals are added in adder 107 to develop a merit signal $Z_1^2 = X_1^2 + Y_1^2$ and the output is coupled to gate 100 and differential amplifier 108. The $X_i$, $Y_i$ signals are similarly squared and added in squaring units 111 and 112, added in adder 113 and applied to gate 101 and differential amplifier 114. The $X_n$, $Y_n$ signals are squared in squaring units 116 and 117, added in adder 118 and applied to gate 102 and differential amplifier 119.

A constant current generator 122 provides a constant current through gates 123 and 125 to capacitor 128 to charge the capacitor. Gate 123 is energized at the beginning of the $\Delta t$ period by a signal from timer 23. Just prior to the start of the $\Delta t$ period gate 123 is opened and gate 124 is closed to discharge any potential which is present on capacitor 128.

The output voltage appearing across capacitor 128 is amplified and inverted in polarity in amplifier 129 to develop a descending ramp signal. This ramp signal is shown in FIG. 4 as signal 139. Signal 139 starts at a high initial value and decreases linearly during the operation of the $\Delta t$ period. This ramp signal is applied to differential amplifiers 130, 108, 114 and 119.

A threshold signal $L_{TH}$ is developed by threshold signal generator 134. The magnitude of the threshold signal is controlled by threshold level control 135. The threshold level $L_{TH}$ is applied to differential amplifier 130 and when the ramp signal drops to the level of $L_{TH}$, an output is developed from differential amplifier 130 which actuates Schmitt trigger 131 to inhibit gate 125.

Referring to FIG. 4 the $L_{TH}$ level is shown as curve 138. When the ramp voltage 139 descends to the $L_{TH}$ level, it is maintained at that level as shown in curve 140. Thus if none of the $Z^2$ signals are greater than $L_{TH}$ the ramp voltage 139 descends to the $L_{TH}$ level and is not permitted to drop below that level.

The magnitude of the descending ramp voltage 139 is also compared with each of the signals $Z_1^2$ through $Z_n^2$ in the separate differential amplifiers 108, 114 and 119. Assume, for example, that the $Z_1^2$ voltage is greater than the threshold voltage. When the ramp voltage descends to the level of $Z_1^2$, shown as curve 142 in FIG. 4, an output is developed in differential amplifier 108 which actuates Schmitt trigger 145. This output of Schmitt trigger 145 opens gate 100 and also inhibits gate 125 through OR gate 148. With gate 125 inhibited, the ramp voltage levels off at the $Z_1^2$ level and is shown as curve 141 of FIG. 4. Since the ramp voltage does not drop further during this $\Delta t$ period, any smaller signals present will not be detected. The circuits shown for the $X_i$, $Y_i$ and $X_n$, $Y_n$ signals operate in the same manner with the gate receiving the strongest $Z^2$ signal being the one actuated.

A second constant current generator 160 provides a constant current through gate 161, and gate 163 to capacitor 164. A signal from timer 23 reduces the potential across capacitor 164 to zero by closing gate 162 prior to the start of the $\Delta t$ period. At the beginning of the $\Delta t$ period the signal from timer 23 closes gate 161 and opens gate 162. However, the constant current signal is not applied to capacitor 164 as it is blocked by gate 163.

When the one of the gates 100 to 102, in our example gate 100, is triggered by a signal from a Schmitt trigger, the signal is also applied to gate 163 through OR gate 148. At this time gate 163 is opened and a constant current signal is applied to capacitor 164 and a ramp signal, similar to that developed across capacitor 128, is developed across capacitor 164 and applied through amplifier 165 to normalizing amplifiers 151 and 152. The gain of normalizing amplifiers 151 and 152 is increased in response to the ramp signal.

When the actuation of gate 100 the $X_1$ and $Y_1$ signals are applied to normalizing amplifiers 151 and 152 and amplified with the magnitude of the signals increasing in response to the magnitude of the ramp signal applied to the normalizing amplifiers. The amplified $X_1$ and $Y_1$ signals are squared in squaring units 153 and 154 and added in adder 155 to form a normalized merit signal $Z_1^2$ which is applied to differential amplifier 156. In response to the ramp signal the $Z_1^2$ signal applied to differential amplifier 156 increases in magnitude. A normalizing voltage from generator 157 is also applied to differential amplifier 156. When the $Z_1^2$ voltage is equal to the normalizing voltage an output is developed by differential amplifier 156 which inhibits gate 163 to stabilize the ramp voltage at a particular voltage, thus stabilizing the gain of normalizing amplifiers 151 and 152.

The output signal from differential amplifier 156 is also applied to monostable multivibrator 168 changing the multivibrator to its set state. The output of monostable multivibrator 168 in its set state is applied to gate 171, monstable multivibrator 169 and gate 170.

The signal from timer 23 actuates range ramp generator 176 at the end of each transmitting pulse. This range ramp increases in magnitude during the entire period between transmitted pulses and is not reset to a predetermined level at the end of each $\Delta t$ period. Thus the magnitude of the range ramp voltage is a function of the time interval since the end of the transmitted pulse and is proportional to range. The range ramp voltage is applied to range amplifiers 178 and 179 through adder 177 and acts to set the gain of the range amplifiers 178 and 179 to position an electron beam in cathode ray tube 182. Since the amplified X and Y signals from range amplifiers 178 and 179 contain range and bearing information the electron beam will be deflected to a position on the cathode ray tube to indicate the range and bearing of a target. However, the electron beam in cathode ray tube 182 is normally biased off until other events have taken place so that a target is not displayed on the face of the cathode ray tube.

With monostable multivibrator 168 in its set state, a signal applied to gate 170 enables the gate. At the same time the $Z^2$ signal, in our example $Z_1^2$, is coupled from gate 100 to amplifier 175 through gate 170 to cathode ray tube 182. This signal is applied to the Z axis modulation of the cathode ray tube and regulates the brightness of the dot produced on the face of the cathode ray tube. The magnitude of the $Z_1^2$ signal is a measure of the confidence in the accuracy of the value of the range and bearing of the received signal. For example, signals received in large noise environments would be less accurate than those received in the noise-free environment. The $Z^2$ signals in the noise-free environment would be very strong while signals received in the high ambient noise environment would be weaker due to the cancellation effect of the random noise. The brightness signal applied to cathode ray tube 182 from gate 170 produces a dot on the face of cathode ray tube 182 with the dot being positioned by the deflecting voltages received from range amplifiers 178 and 179.

The system described in FIG. 3 will also display the Doppler shift on the cathode ray tube. Potential generators 185, 186 and 187 are coupled to gates 101 to 102, respectively. With the actuation of a particular gate these potentials are applied to gate 171. In this example since the $X_1$ and $Y_1$ signal represents the center frequency of the system or the frequency of the transmitted signal there is no Doppler shift and potential 1 from potential generator 185 would be zero. Assume that the signal received has an up Doppler and was received as signal $X_i$ and $Y_i$. Thus in this example the potential from potential generator 186, which is less than zero, would be applied to stage 177. If the Doppler shift was down the signals would be received as $X_n$, $Y_n$ and a potential, greater than zero, from the potential generator 187 would be applied through gate 102 to gate 171. Only one potential is applied during each $\Delta t$ period and this potential is a function of the amount of Doppler shift.

With monostable multivibrator 168 in its set state a signal is applied to monostable multivibrator 169 causing it to assume its set state. Monostable multivibrator 168 has a longer unstable period than monostable multivibrator 169 with the difference in the periods being of a small magnitude. With monostable multivibrator 168 in its set state an enabling signal is applied to gate 171. However, since monostable multivibrator 169 is also in its set state gate 171 is disabled. After a brief interval of time monostable multivibrator 169 returns to its reset state and applies an enabling signal to gate 171 transferring the Doppler shift potential to adder 177 where it is added to the range ramp signal and applied to the range amplifiers 178 and 179. A brief interval of time after the enabling of gate 171 monostable multivibrator 168 returns to its reset state and the gate is disabled.

Referring to FIGS. 5 and 6, there is shown a representation of the range ramp signal 189 which gradually increases during the ping interval. At point 190 a signal is received which will be designated as $X_n$, $Y_n$, that is a down Doppler signal. This signal is shown as signal 200 on the cathode ray tube 201 of FIG. 6. A brief interval of time after dot 200 appears on the cathode ray tube, showing the range and bearing of the target, the voltage 192 representing the Doppler shift is superimposed on the range ramp voltage. This voltage applied to the range amplifiers 178, 179 causes the dot to move radially outward from the center of the cathode ray tube 102 as shown by mark 203. Since this motion is relatively rapid a tail will be formed showing the direction of relative movement of the target. Since the magnitude of the Doppler shift potentials is determined by the amount of Doppler shift, the length of the tail will give the magnitude of the relative motion of the target.

At point 193 on the range ramp a second target is detected and is represented by dot 204 on the face of cathode ray tube 201. This target is assumed to be represented by the $X_i$, $Y_i$ potential and thus has an up Doppler representing a relative movement towards the center of the scope 201. The voltage 194 superimposed on the range ramp voltage 189 produces a tail 205 which indicates this relative motion.

Another embodiment of the system is shown in FIG. 7. The bearing signals $X_1$, $Y_1$, $X_i$, $Y_i$ and $X_n$, $Y_n$ are coupled to sliding window integrators 207, 208 and 209 respectively. Sliding window integrator 207 is shown in detail and is identical in operotion to sliding window integrators 208 and 209. The sliding window integrator 207 integrates the X and Y signals received over several of the $\Delta t$ time intervals in order to increase the amount of information obtained from the returning signal by increasing the integration time. If a long integration time were used in a single integration, the discrete range intervals measured would be too coarse to provide a sufficiently accurate range. However, making the time intervals small decreases the amount of information obtained from the returning signals. By using a double integration with a sliding window integrator the required degree of range accuracy is attained together with a maximum extraction of the information contained in the returning signal.

The X and Y signals are fed into separate storage stages of a shift register 210 and are stepped through the stages of the shift register by signals from clock 211 corresponding to the beginning and end of the $\Delta t$ time periods. The output of the first stage 212 of the Y shift register 210 is coupled to adder 213 which adds it to the number stored in storage register 214. The number stored in the last stage 216 of the Y shift register 210 is coupled to subtractor 217 and subtracted from the number stored in storage register 214. Thus the number stored in storage register 214 represents the total of the last four Y signals received designated as $Y_1(k)$, $Y_1(k-1)$, $Y_1(k-2)$, and $Y_1(k-3)$. The X portion of the shift register develops an X signal in storage register 218 in a similar manner.

The outputs of storage registers 214 and 218 are coupled to squaring circuits 219 and 220. The squared bearing signals are then coupled to adder 222 where they are added to form a merit signal designated as $Z_1{}^2 = X_1{}^2 + Y_1{}^2$. The X and Y bearing signals are also separately coupled to gate 223. In a like manner the $X_i$ and $Y_i$ signals from sliding window integrator 208 are coupled to gate 224 and the $X_n$ and $Y_n$ signals from sliding window integrator 209 are coupled to gate 225. The $X_i$, $Y_i$ signals are squared in squaring circuits 227 and 228 and added in adder 229 to form a $Z_i{}^2 = X_i{}^2 + Y_i{}^2$ signal. The $X_n$ and $Y_n$ signals from sliding window integrator 209 are squared in squaring circuits 230 and 231 and added in adder 232 to develop a $Z_n{}^2 = X_n{}^2 + Y_n{}^2$ signal. The $Z_1{}^2$ output from adder 222 is coupled to differential amplifiers 234 and 235. The $Z_i{}^2$ output from adder 229 is coupled to differential amplifiers 234 and 236 and the $Z_n{}^2$ output from adder 232 coupled to differential amplifiers 235 and 236.

In the system shown in FIG. 7 it is assumed that only three signals are received, where the $X_1$, $Y_1$ signals represent the returning signal with no Doppler shift, the $X_i$, $Y_i$ signals represent a returing signal having an up Doppler shift and the $X_n$, $Y_n$ signals represent a returning signal having a down Doppler shift. In order to determine which of the $Z^2$ signals has the greatest magnitude the output of differential amplifiers 234, 235 and 236 are coupled to AND gates 238, 239 and 240. Each of the differential amplifiers produces an output on one of two different circuits depending upon which of the two input signals is the greatest. If $Z_1{}^2$ is greater than $Z_i{}^2$ the output of differential amplifier 234 is coupled to AND gate 238 and if $Z_i{}^2$ is greater than $Z_1{}^2$ the output of differential amplifier 234 is coupled to AND gate 239. With the $Z_1{}^2$ signal greater than the $Z_n{}^2$ signal the output of differential amplifier 235 is coupled to AND gate 238. If $Z_n{}^2$ is greater than $Z_1{}^2$ the output of differential amplifier 235 is coupled to AND gate 240. If $Z_i{}^2$ is greater than $Z_n{}^2$ the output of differential amplifier 236 is coupled to AND gate 239 and if $Z_n{}^2$ is greater than $Z_i{}^2$ the output of differential amplifier 236 is coupled to AND gate 240. Thus if $Z_1{}^2$ is the largest of the three signals an output is developed by AND gate 238. If $Z_i{}^2$ is the largest signal an output is developed by AND gate 239 and if $Z_n{}^2$ is the largest signal an output is developed by AND gate 240.

AND gates 238, 239 and 240 are coupled to gates 223, 224 and 225 respectively to energize these gates. Only the gate corresponding to the largest merit signal present is energized and this gate couples the X, Y bearing signals applied thereto to amplifiers 242 and 243. The output of the AND gate 238 is also coupled to lamp 244 through amplifier 245 to energize the lamp at the same time gate 223 is energized. In the same manner signals from AND gates 239 and 240 energize lamps 246 and 247. Thus if lamp 244 is energized it indicates that there is no Doppler shift, if lamp 246 is energized it indicates that there is an up Doppler shift and if lamp 247 is energized it indicates that there is a down Doppler shift.

The bearing signals from amplifiers 242 and 243 are applied to range amplifiers 248 and 249 respectively. The output of amplifiers 242 and 243 are also applied to squaring circuits 251 and 252. The squared signals are added in adder 253 to develop a normalized merit signal which is coupled to amplifiers 254 and 255.

Differential amplifier 255 compares the normalized merit signal with the threshold signal $L_{TH}$ generated in threshold signal generator 257. If the merit signal is greater than the threshold signal an output signal is developed enabling AND gate 258. AND gate 258 couples a constant current from constant current generator 259 to capacitor 260 to develop a ramp voltage which is amplified in amplifier 261 and applied to amplifiers 242 and 243. A shorting switch 262 is provided, and is energized at the beginning of each $\Delta t$ period by signals from clock 211, to reduce the voltage across capacitor 260 to zero.

The ramp voltage from capacitor 260 causes the gain of amplifiers 242 and 243 to increase thus increasing the magnitude of the two bearing signals and the merit signal. When the merit signal applied to differential amplifier 254 is greater than the normalizing voltage signal from normalizing voltage generator 264 an output is developed which is coupled to differentiator 265 and AND gate 258. This signal disables AND gate 258 to stop the rise of the ramp voltage developed across capacitor 260 and thus establish the gain of amplifiers 242 and 243 at the proper level to provide normalized signals to range amplifiers 248 and 249.

The two bearing signals from range amplifiers 248, 249 are applied to the desired deflection plates of a cathode ray tube 266 to position the electron beam at the desired position to indicate the range of the target. The gain of the amplifiers 248 and 249 are regulated by a ramp signal from range ramp generator 267 which starts at the beginning of the transmitted pulse so that the gain of the amplifiers 248 and 249 is the function of the range. The signal from differential amplifier 265 modulates the Z axis of cathode ray tube 266 to present a bright spot when the electron beam is positioned at the correct range and bearing.

I claim:

1. A system for measuring a component of the movement of an object relative to a reference portion, including in combination, means for periodically transmitting waves of a particular frequency from the reference position, means for receiving at the reference position said waves reflected from the object with said reflected waves having frequencies differing from said particular frequency in proportion to the relative movement of the object, said receiving means developing electrical signals having frequencies proportional to the frequency of the reflected waves, a plurality of filter means for separating said electrical signals according to their frequency coupled to said receiving means, separate signal processing means coupled to each of said filter means and responsive to said electrical signals from said filter means coupled thereto to develop merit signals, said merit signals from each of said signal processing means representing a different magnitude of relative movement of the object, threshold signal generating means, selecting means coupled to each of said signal processing means and said threshold signal generating means, said selecting means acting to select the largest of said merit signals which is greater than said threshold signal, and display means coupled to said selecting means for displaying the relative movement information contained in said selected merit signal.

2. The system of claim 1 wherein, said display means includes cathode ray tube circuit means having an electron beam therein impinging on a faceplate, a plurality of potential generating means each associated with a different one of said merit signals and developing different potential levels and polarities corresponding to the magnitude and direction of relative movement of the object, said selecting means further acting to select said potential generating means associated with said selected merit signal and to couple the same to said cathode ray tube whereby the potential within said selected potential generating means deflects said electron beam according to the magnitude and direction of said relative movement.

3. The system of claim 1 wherein, said display means includes a plurality of lamp means, each associated with a separate one of said signal processing means, said selecting means further acting to energize said lamp means associated with said signal processing means developing said selected merit signal to indicate the magnitude and direction of said relative movement.

4. The system of claim 1 wherein said selecting means includes, a plurality of gate means each coupling a separate one of said signal processing means to said display means, a plurality of first comparing means each coupled to a separate one of said gate means and to said signal processing means coupled to said same gate means for receiving said merit signal, ramp signal generating means coupled to each of said first comparing means for applying said ramp signal thereto, each of said first comparing means being responsive to a merit signal which is substantially equal to said ramp signal to actuate said gate coupled thereto to couple said substantially equal merit signal to said display means, disabling circuit means coupled to each of said gate means and said ramp signal generating means, said disabling circuit means being responsive to the actuation of one of said gate means to disable said ramp signal generating means, second comparing means coupled to said threshold signal generating means, said ramp signal generating means and said disabling circuit means, said second comparing means being responsive to said threshold signal substantially equal to said ramp signal to actuate said disabling circuit means whereby said ramp signal generating means is disabled.

5. A system for measuring the range, bearing and a component of the movement of an object relative to a reference position, including in combination, means for periodically transmitting waves of a particular frequency from the reference position, means for receiving at the reference position said waves reflected from the object with said reflected waves having frequencies differing from said particular frequency in proportion to the relative movement of the object, said receiving means developing electrical signals from said reflected waves having frequencies proportional to the frequency of the reflected wave, a plurality of filter means for separating said electrical signals according to their frequency coupled to said receiving means, separate signal processing means coupled to each of said filter means and responsive to said electrical signals from said filter means coupled thereto to develop first and second bearing signals which are a function of the bearing of the object, said signal processing means including means for combining said first and second signals to develop merit signals, said merit signals from each of said signal processing means representing a different magnitude of relative movement of the object, threshold signal generating means, selecting means coupled to each of said signal processing means and said threshold signal generating means, said selecting means acting to select the largest of said merit signals which is greater than said threshold signal and further to select said first and second bearing signals forming said selected merit signal, timing means coupled to said transmitting means and said selecting means for measuring the time interval between said transmitted wave pulses and said selected merit signal, and display means coupled to said timing means and said selecting means for displaying the range, bearing and relative movement information contained in said selected merit signal, said time interval and said selected first and second bearing signals.

6. The system of claim 5 having first, second and third signal processing means to develop first, second and third merit signals respectively, and wherein said selecting means includes first, second and third gate means coupling said first, second and third signal processing means respectively to said display means, first, second and third AND circuit means coupled to said first, second and third gate means respectively, first comparing means coupled to said first and second signal processing means and said first and second AND circuit means, second comparing means coupled to said first and third signal processing means and said first and third AND circuit means, third comparing means coupled to said second and third signal processing means and said second and third AND circuit means, said first and second comparing means being responsive to said first merit signal which is greater than said second and third merit signals to enable said first AND circuit, said first and third comparing means being responsive to said second merit signal which is greater than said first and third merit signals to enable said second AND circuit, said second and third comparing circuits being responsive to said third merit signal which is greater than said first and second merit signals to enable said third AND circuit, said first, second and third merit signals acting to enable one of said AND circuits to open said gate means coupled thereto to select one of said first, second and third merit signals and said first and second bearing signals forming said selected merit signal and couple the same to said display means.

7. The system of claim 6 wherein said selecting means further includes normalizing amplifier means coupled to said first, second and third gate means for receiving and amplifying said selected first and second bearing signals from said opened gate means, normalizing ramp signal generating means coupled to said normalizing amplifier means for applying a ramp signal thereto to regulate the gain of said normalizing amplifier means, squaring and adding circuit means coupled to said normalizing amplifier means for squaring and adding said amplified selected first and second bearing signals to develop an amplified merit signal, fourth comparing means coupled to said squaring and adding circuit means, said threshold signal generating means and said normalizing ramp signal generating means, said fourth comparing means being responsive to said amplified merit signal substantially equal to said threshold signal to enable said normalizing ramp signal generating means, normalizing potential generating means, fifth comparing means coupled to said squaring and adding circuit means and said normalizing potential generating means, said fifth comparing means being responsive to said amplified merit signal substantially equal to said normalizing potential to develop a disabling signal for disabling said normalizing ramp signal generating means and means coupling said normalizing amplifier means to said display means for applying said amplified first and second bearing signals thereto.

8. The system of claim 7 wherein, said display means includes cathode ray tube circuit means having an electron beam impinging on a faceplate, control means for regulating the intensity of said electron beam and means for positioning said electron beam on said faceplate, range amplifier means coupling said normalizing amplifier means to said positioning means for applying said amplified first and second bearing signals thereto, range ramp potential generating means coupled to said timer means and said range amplifier means for regulating the gain of said range amplifier means and thereby the magnitude of said amplified first and second bearing signals in accordance with the range of the object, said cathode ray tube circuit means being responsive to said amplified first and second bearing signals applied to said positioning means to position said electron beam on said faceplate according to the range and bearing of the object, said intensity control means being coupled to said fifth comparing means and being responsive to said disabling signal to increase the intensity of said electron beam to cause said beam to make a visible mark on said faceplate.

9. The system of claim 8 wherein, said display means includes first, second and third lamp means coupled to said first, second and third AND circuit means respectively, said enabled AND circuit means acting to energize said lamp coupled thereto for indicating the direction and magnitude of said relative movement.

10. The system of claim 5 wherein said selecting means includes, a plurality of first gate means each coupling a separate one of said signal processing means to said display means, a plurality of first comparing means each coupled to a separate one of said first gate means and to the signal processing means coupled to the same first gate means for receiving said merit signal and selection ramp signal generating means coupled to each of said first comparing means for applying a selection ramp signal thereto, each of said first comparing means being responsive to a merit signal which is substantially equal to said selection ramp signal to actuate said first gate means coupled thereto to couple said merit signal and the first and second bearing signals associated with said merit signal to said display means, disabling circuit means coupled to each of said first gate means and said selection ramp signal generating means, said disabling circuit means being responsive to the actuation of one of said first gate means to disable said selective ramp signal generating means, second comparing means coupled to said threshold signal generating means, said selection ramp signal generating means and said disabling circuit means, said second comparing means being responsive to said threshold signal substantially equal to said selection ramp signal to actuate said disabling circuit means whereby said selection ramp signal generating means is disabled.

11. The system of claim 6 wherein said selecting means further includes normalizing amplifier means coupled to said plurality of first gate means for receiving and amplifying said selected first and second bearing signals from said enabled first gate means, normalizing ramp signal generating means coupled to said normalizing amplifier means for applying a normalizing ramp signal thereto to regulate the gain of said normalizing amplifier means, squaring and adding circuit means coupled to said normalizing amplifier means for squaring and adding said amplified first and second bearing signals to develop an amplified merit signal, third comparing means coupled to said squaring and adding circuit means and said normalizing ramp signal generating means, said third comparing means being responsive to said amplified merit signal substantially equal to said normalizing potential to develop a momentary impulse signal, a plurality of potential generating means each associated with a different one of said merit signals and coupled to said first gate means receiving said associated merit signals, each of said potential generating means developing different potential levels and polarities corresponding to the degree and direction of relative movement of the object, said display means including cathode ray tube circuit means having an electron beam impinging on a faceplate, intensity control means for regulating the intensity of said electron beam and deflecting plates for positioning said electron beam, range amplifier means coupling said normalizing amplifier means to said deflection plates for applying said amplified first and second bearing signals thereto, range ramp potential generating means coupled to said timer means and said range amplifier means for regulating the gain of said range amplifier means and thereby the magnitude of said first and second amplified bearing signals in accordance with the range of the object, said cathode ray tube circuit means being responsive to said amplified first and second bearing signals applied to said deflection plates to position said electron beam on said faceplate according to the range and bearing of the object, said intensity control means being coupled to said first gate means and being responsive to said selected merit signal to increase the intensity of said electron beam to cause said beam to make a visible mark on said faceplate with the intensity of said visible mark being of a function of the magnitude of said selected merit signal, second gate means coupled to said third comparing means and coupling said plurality of first gate means to said range amplifier means, said second gate means being responsive to said momentary impulse to couple said potential level associated with said actuated first gate means to said range amplifier means for momentarily deflecting said electron beam according to the magnitude and direction of said relative movement.

12. A system for displaying the direction and magnitude of a component of the movement of an object relative to a reference position, including in combination, cathode ray tube circuit means having a faceplate, an electron beam impinging on said faceplate to make a visible mark thereon, and means for positioning said electron beams in response to positioning signals applied thereto, signal means for providing said positioning signals, amplifier means adapted to be controlled in gain by a potential applied thereto coupling said signal means to said positioning means, potential generating means providing a plurality of potentials of different magnitudes and polarities, means for selecting one of said plurality of potentials corresponding to said relative movement coupling said potential generating means to said amplifier means, said amplifier means being responsive to said selected potential whereby the position of said electron beam is changed in accordance with the magnitude of said relative movement.

13. The system of claim 12 wherein, said selecting means includes momentary switching means for coupling said selected potential to said amplifier means momentarily, whereby the position of said electron beam is momentarily changed.

References Cited

UNITED STATES PATENTS

| | | | |
|---|---|---|---|
| 2,408,742 | 10/1946 | Eaton | 343—9 |
| 2,516,343 | 7/1950 | Roberts | 343—9 |
| 3,005,194 | 10/1961 | Goodell et al. | 343—9 X |
| 3,166,746 | 1/1965 | Jacobson | 343—9 |

RICHARD A. FARLEY, *Primary Examiner.*

U.S. Cl. X.R.

340—6; 343—9